May 25, 1943.  J. LEDWINKA  2,320,085
TRUCK BOLSTER SUSPENSION
Filed Jan. 5, 1940  2 Sheets-Sheet 1
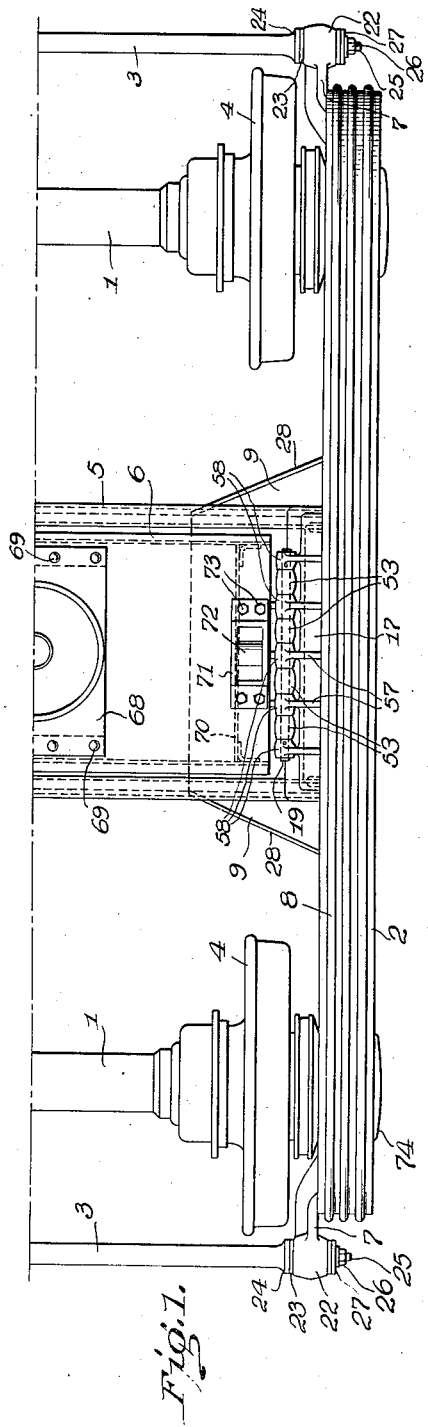
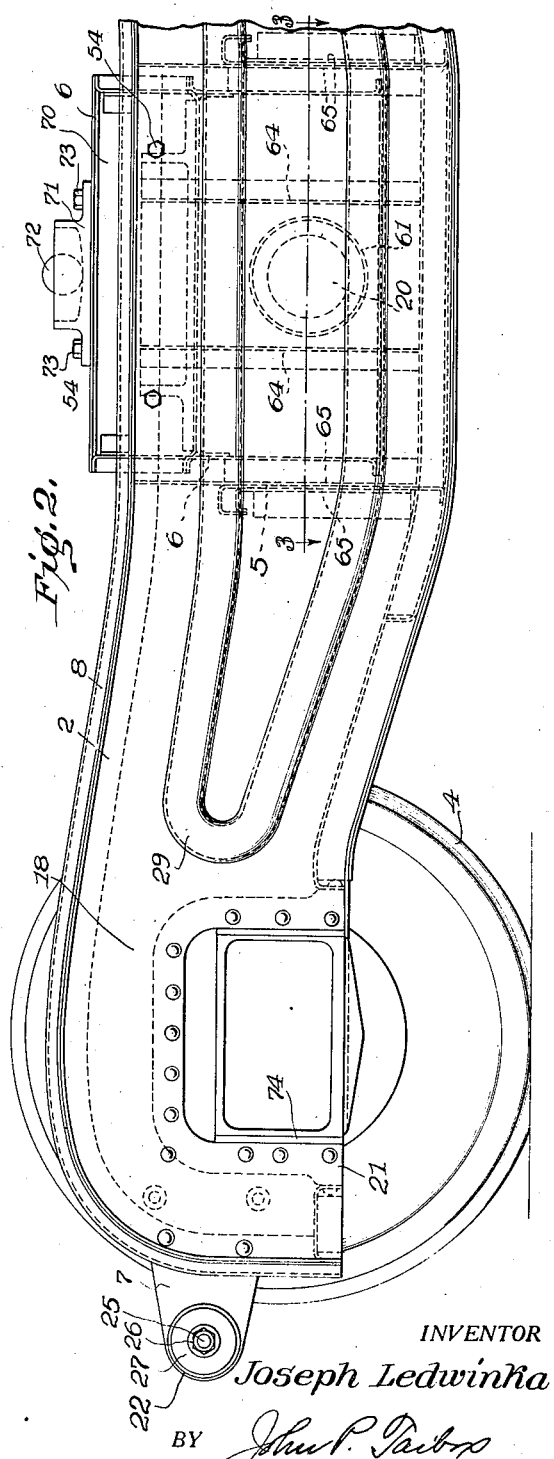
INVENTOR
Joseph Ledwinka
BY
ATTORNEY May 25, 1943.　　　J. LEDWINKA　　　2,320,085
TRUCK BOLSTER SUSPENSION
Filed Jan. 5, 1940　　　2 Sheets-Sheet 2
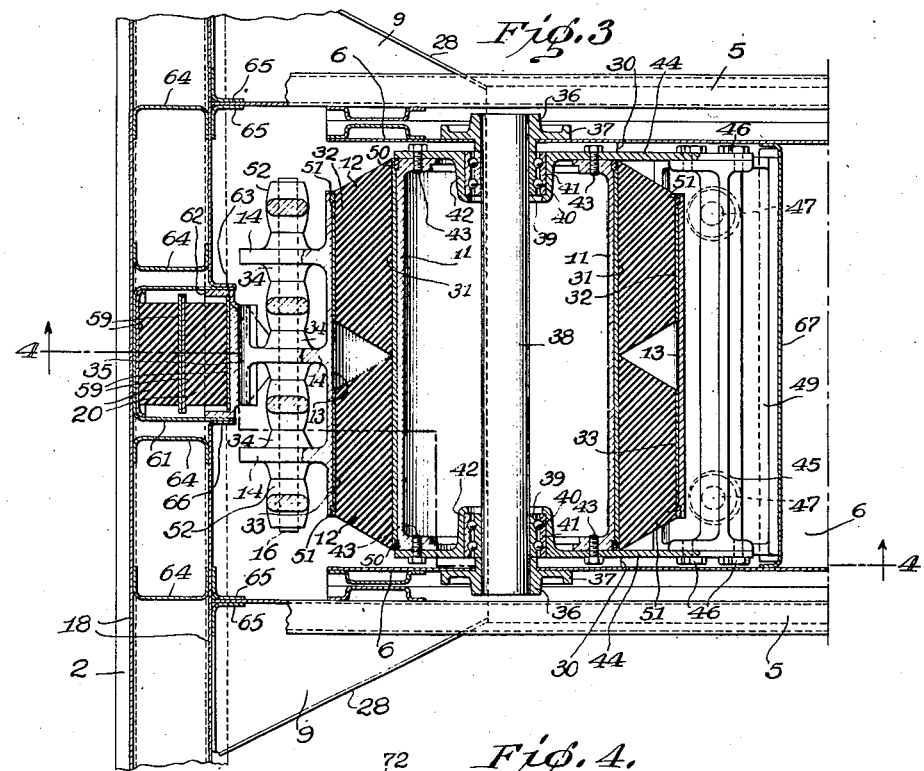
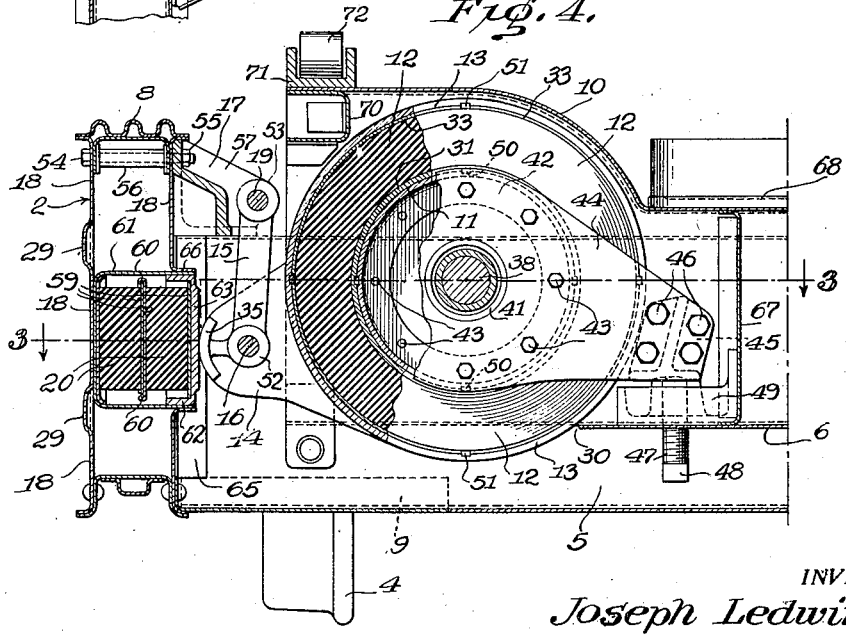
INVENTOR
Joseph Ledwinka
BY John P. Barber
ATTORNEY Patented May 25, 1943

2,320,085

UNITED STATES PATENT OFFICE 2,320,085

TRUCK BOLSTER SUSPENSION

Joseph Ledwinka, Philadelphia, Pa., assignor to Edward G. Budd Manufacturing Company, Philadelphia, Pa., a corporation of Pennsylvania Application January 5, 1940, Serial No. 312,470

15 Claims. (Cl. 105—190)

The present invention relates to railway trucks.

More specifically, it relates to trucks of build-up construction wherein a yieldable material such as rubber is employed in place of metal springs.

The invention relates more particularly to the provision of annular rubber springs for resiliently supporting the bolster, and to special suspensions cooperating with the rubber elements.

A further object of the invention is to provide a light weight compact truck, having a pleasing streamlined appearance.

Other objects and advantages will be understood from the present specification in connection with the drawings which form a part thereof, and which disclose, more or less diagrammatically, a preferred form of the invention.

In said drawings:

Fig. 1 is a plan view of one longitudinal half of the complete truck;

Fig. 2 is a fragmentary side elevation of the truck on a much larger scale;

Fig. 3 is a fragmentary sectional plan view, the section being made on the plane indicated by the line 3—3 of Figs. 2 and 4, and on a still larger scale; and Fig. 4 is a fragmentary elevation corresponding to Fig. 3, with certain parts in section on the planes indicated by the broken line 4—4 of Fig. 3.

In all the figures, corresponding elements are indicated by similar reference characters.

The truck comprises the built-up hollow side frames 2, connected at their ends by the transverse rods or braces 3, and at their midpoints by the transom 5. An axle 1 at each end of the truck carries the wheels 4, and within the transom 5 is housed the bolster 6. The transverse braces 3 may be mounted in suitable bores in the enlarged ends 22 of brackets 7, secured to the side frames 2, with yieldable bushings 23 of rubber or the like in said bores, to afford a slight yield. These parts may be assembled by providing a suitable shoulder 24 near each end of each rod 3, while the ends 25 of the rods may be reduced and threaded to receive nuts 26 and washers 27, to hold the rubber in place.

It will be understood that the side frames 2 are preferably built-up of suitably formed halves of sheet metal of sufficient thickness and strength, secured to one another in any suitable manner, as by welding. Preferably a corrugated top plate 8 will be provided and welded to the halves forming the side frames, for the purpose of increasing the strength and stiffness thereof, while at the same time affording a pleasing appearance. Each side plate may have the customary pedestals 21 formed therein, to carry the journal boxes 74.

Angle braces 9 may be secured to the side frames and to the transom as shown, to afford a strong and rigid connection therebetween. These angle braces 9 consist preferably of triangular pieces of sheet metal with flanges bent up therefrom, as indicated at 28. Stiffening corrugations, such as that indicated at 29 in Fig. 2, may be provided to strengthen the side frames and at the same time to form decorative features of the same.

The bolster 6 at one end may have an arcuate upper wall as shown at 10, in Fig. 4, and below the same a portion of the bottom of the bolster may be cut away, as indicated at 30, in order to provide room for the annular rubber springs. Each of these consists of a cylindrical drum or barrel 11, upon which may be mounted the inner tubular or cylindrical metal support 31, which carries the rubber rings 12, which in turn are surrounded by the metal sleeves 32 and 33, vulcanized or otherwise secured thereto. These sleeves 32 and 33 are in turn received in the housing 13 which is cylindrical in shape, and has a plurality of flanges 14 projecting outwardly therefrom, each flange having a bored lug 34 therein, the bores being properly alined to receive a pin or shaft 16. The central flange 14 may also carry an arcuate abutment 35, for a purpose which will be disclosed hereinafter.

Mounted in suitable bearings 36, formed in flanged members 37 secured to the bolster, is a shaft 38 extending across the bolster and carrying the inner ball races 39, on which travel the balls 40 and the cooperating outer races 41, which in turn are mounted within the end pieces 42, secured to the drum or barrel 11 in any suitable manner, as by the cap screws 43. The said end pieces 42 have arms 44 extending inwardly therefrom, that is, toward the middle portion of the bolster, and these are secured to a transverse casting 45, as by the cap screws 46.

Arranged below the casting 45, and carried by the bolster, is a pair of adjusting screws 47, each of which may have a squared head 48 and which preferably is threaded through a suitable casting 49 secured to the bolster, so that by turning each of the screws 47 by means of its head 48 the casting 45 may be lifted with respect to the bottom of the bolster, so as to vary the stress in the rubber rings. It will be understood that the sleeve 31 is secured to the drum 11, for example by keys and key-ways 50 or other suitable fastenings, and that the sleeves 32 and 33 are secured to the surrounding housing 13 by similar means, such as the keys 51.

The pin or shaft 16 passes through the lugs 34 and traverses also the lugs 52, formed at the lower ends of the links 15, each of which carries a similar bored lug 53 at its upper end. A similar construction is employed at said upper end to hingedly support the links from the adjacent side frame. For this purpose, a casting 17 is secured to the side frame 2 by means of bolts 54 and nuts 55 passing through corresponding holes in the casting 17, tubular spacers 56 surrounding said bolts, within the hollow side frames to provide rigidity and prevent deforming the side frame upon tightening the nuts.

The casting 17 carries a number of webs or flanges 57, each having a bored lug 58 thereon, and a shaft or pin 19 is passed through the lugs 53 and 58, to provide a strong pivotal connection therebetween. It will thus be seen that each end of the bolster is supported yieldably within the transom by means of the links 15, which permit vertical as well as horizontal movement of the said bolster. When a load is applied to the bolster, it will be transferred to the rubber rings 12, which will be stressed in shear thereby.

Side sway of the bolster is possible to a limited extent by reason of other rubber springs 20, arranged in each side frame so as to be subject to compression when the corresponding end of the bolster moves outward. The rubber springs 20 are formed of plates or slabs of rubber, vulcanized or otherwise secured to metal end plates 59, so as to form sandwiches therewith. The edges of certain of these plates may be bent over as indicated at 60, to interlock the sandwiches with one another.

A suitable casing 61 encloses the rubber sandwiches, and, as here shown, is cylindrical so as to afford a simple guide for a slidable plunger 62, which includes a base 63 forming an abutment for the arcuate member 35, which may slide and/or roll on the said abutment 63 and may also force the same outwardly, by compressing the rubber blocks 20. It is clear that while a cylindrical casing has been illustrated, this casing may equally well be of any other desired shape.

Suitable stiffening members, such as partitions 64, may be provided in the side frames and secured thereto, as by welding or the like, and angle braces 65 may also be provided, as indicated in Fig. 3 to secure the transoms to the side frames. Casing 61 may be supported by spot welding its closed outer end to the adjacent plate 18 of the side frame, while its inner end may pass through a flanged opening 66 in a companion inner plate of the side frame and be secured thereto by spot welding the cylindrical wall of the casing 61 to the corresponding cylindrical flange 66.

The bolster may also have one or more strengthening partitions welded therein, as shown at 67, to assist in supporting the center plate 68, which is secured to the bolster at the midpoint of its top surface by any suitable means, such as the bolts 69. At each outer end the bolster may be reinforced by a transverse member 70 of U-shaped or channel section as shown in Fig. 4, to assist in carrying the load imposed by the bearing 71, secured to the bolster by bolts or the like 73, and in which rolls the roller bearing 72, for supporting the vehicle body.

The operation of the invention will be obvious from the structure disclosed. Briefly it is as follows:

When a load is carried by the bolster, the bolster will tend to descend, and in so doing it will cause the housing 13 to turn with respect to the drum 11, thus stressing the rubber rings 12 in shear. Since these rings are made somewhat trapezoidal in cross section as indicated, they will be of approximately uniform strength at various radial distances from the center of the shaft 38.

The hinged links 15 permit sway of the bolster from side to side as well as vertical motion thereof, and increasing loads on the bolster will merely increase the shearing stress in the rubber and vice versa. Any side sway of the bolster will be resisted by the rubber slabs 20 acting in compression, thus providing gradually increasing resistance to increased sway. The rubber bushings 23 surrounding the ends of the rods or braces 3 will allow the side frames to adjust themselves to minor inequalities of alinement, such as result in service when passing over a track, thus preventing any binding from occurring, while nevertheless having sufficient rigidity to cause the truck to function properly as a whole. The arcuate abutments 35 may slide as well as roll along their companion abutments 63, so as to provide the necessary freedom of movement thereat.

While the present invention has been described herein in connection with a certain embodiment thereof, it is obvious that this embodiment is not the only form in which the invention may be constructed, but that it is merely a disclosure of a certain type of structure which at present is believed to be the preferred form.

Inasmuch as many changes, additions, and omissions may be made with respect to the structures disclosed herein, attention is specifically directed to the fact that the invention is not to be considered as limited to the precise structures herein disclosed, but is defined solely by the following claims.

I claim:

1. In a truck comprising a frame and a bolster, means for resiliently supporting said bolster, comprising an annular rubber element, a drum secured to the inside of the element, means pivotally supporting said drum on the bolster, means securing the drum to the bolster and preventing rotation of said drum at least in one direction about its pivot, and means secured to the outside of the element and hingedly attached to said frame, whereby vertical motion of the bolster with respect to the said frame will stress the element in shear.

2. In a truck comprising a frame and a bolster, means for resiliently supporting said bolster, comprising an annular rubber element, a metal drum secured to the inside of said element, said drum being pivotally mounted on the bolster, means for adjusting the drum about its pivot but preventing rotation of the drum at least in one direction with respect to the bolster, and means comprising a casing secured to the outside of the element and having a portion hingedly connected to said frame, whereby vertical motion of the bolster with respect to the said frame will stress the said element in shear.

3. In a truck comprising a frame and a bolster, means for resiliently supporting said bolster, comprising an annular rubber element, a drum secured to the inside of said element, said drum being pivotally mounted on the bolster, means comprising an arm extending from the drum, for preventing rotation of the drum at least in one direction with respect to the bolster, an adjusting device for setting said arm with respect to the bolster, and means comprising a casing secured to the outside of the element and having a portion hingedly connected to said frame, whereby vertical motion of the bolster with respect to the said frame will stress the said element in shear.

4. In a truck comprising a frame and a bolster, an annular rubber element, a supporting means secured to the inside of the element and supporting said element on the bolster, means preventing rotation of said supporting means with respect to the bolster, a link, and means secured to the outside of the element and pivotally attached to said frame through said link, whereby vertical motion of the bolster with respect to the said frame will stress the element in shear.

5. In a truck comprising a frame and a bolster, an annular rubber element, a supporting means secured to the inside of the element and supporting said element on the bolster, means preventing rotation of said supporting means with respect to the bolster, a number of links, a bracket secured to said frame, one end of each link being pivotally mounted on said bracket, and a casing secured to the outside of the element, the other end of each link being pivotally connected to said casing, whereby vertical motion of the bolster with respect to the said frame will stress the element in shear.

6. In a truck comprising a frame and a bolster, means for resiliently supporting said bolster comprising an annular rubber element whose axis extends horizontally and at right angles to the bolster axis, means securing the inner cylindrical surface of said element to one, and the outer cylindrical surface to the other, of said bolster and said frame, one of said securing means being a fixed connection and the other a hinged connection permitting relative vertical movement between said frame and bolster, whereby vertical motion of the bolster with respect to the said frame will cause relative rotative movement of the means secured to the outer and inner surfaces respectively of said element about the axis of the element and will stress the said element in shear.

7. In a truck comprising a frame structure and a bolster structure, an annular rubber element, the axis of this element extending about horizontally in the longitudinal direction of the truck, means being connected to the inner cylindrical surface of said element and being mounted stationary on one of said structures, other means being connected to the outer cylindrical surface of said element, said means comprising a radially extending arm, said arm being hingedly connected to the other of said structures, a spring cushion being inserted between said arm and said last-named structure, said arrangement providing for resilient resistance to vertical up and down movements and to horizontal lateral movements of the bolster structure with respect to the frame structure.

8. In a truck according to claim 7, said means secured to the inner cylindrical surface of said rubber element being mounted stationary on said bolster structure and said spring cushion being mounted on said frame structure.

9. In a truck comprising a frame and a bolster, means for resiliently supporting said bolster on said frame, said means comprising an annular rubber element, the axis of this element extending generally horizontally and in the longitudinal direction of the truck, means rigidly securing one cylindrical surface of the element to the bolster, and means securing the other cylindrical surface thereof to said frame, said securing means being adapted to permit vertical motion of the bolster with respect to the said frame and to cause relative rotation of said cylindrical surfaces of the rubber element thereby stressing the said element in shear.

10. In a truck comprising a frame structure and a bolster structure, means for resiliently supporting said bolster structure on said frame structure, said means comprising an annular rubber element, the axis of said element extending generally horizontally at about a right angle to the bolster structure, a metal drum secured to the inside of said element, said drum being stationary mounted on one of said structures, means preventing rotation of the drum with respect to the structure on which it is mounted, and means comprising a casing secured to the outside of the element and having a portion pivotally connected to the other of said structures to permit relative vertical movement between said two structures, whereby vertical motion of the bolster structure with respect to the said frame structure will stress the said element in shear.

11. In a truck comprising a frame and a bolster, an annular rubber element whose axis is at right angles to the bolster axis, connecting means between one surface of said element and said bolster, connecting means between the opposite surface of said element and said frame, said connecting means being adapted to permit relative vertical movement between side frame and bolster while subjecting the rubber to torsional shear upon descent of the bolster relative to the frame, and additional means cooperating with said first-named means to provide resilient resistance to lateral movement of the bolster with respect to the frame.

12. In a truck comprising a frame and a bolster, an annular rubber element whose axis is at right angles to the bolster axis, connecting means between one surface of said element and said bolster, connecting means between the opposite surface of said element and said frame, said connecting means being adapted to permit relative vertical movement between side frame and bolster while subjecting the rubber to torsional shear upon descent of the bolster relative to the frame, and additional means cooperating with said first-named means to provide resilient resistance to lateral movement of the bolster with respect to the frame, said last-named means including a rubber element stressed in compression.

13. In a truck comprising a frame and a bolster; a lever extending substantially in the general direction of said bolster and being mounted on said bolster rotatably about an axis extending generally horizontally and in the longitudinal direction of the truck; a torsion spring being inserted between said bolster and said lever and having its axis extending in substantially the same direction as the aforesaid axis; connecting means between a point of said lever spaced from the lever's axis and a point of said frame, said means being adapted to allow vertical motion of the bolster with respect to said frame and to cause rotation of said lever about its axis thereby stressing said torsion spring.

14. In a structure, a first member and a second member; a lever journalled to said first member; spring means being inserted between the lever and said first member; a link having its ends journalled respectively to a point of said lever remote from its axis of rotation and said second member so as to permit relative movement against the action of the said spring means in a direction substantially transversely to a plane defined by the axis of said lever and the journal between said lever and said link; cushion means being inserted between said second member and a point on the lever and link system between said first and second member so as to resiliently limit the relative movement between the two members in substantially the aforesaid plane.

15. In a structure, a first member and a second member; a lever journalled to said first member; spring means being inserted between the lever and said first member; a link having its ends journalled respectively to a point of said lever remote from its axis of rotation and said second member so as to permit relative movement against the action of the said spring means in a direction substantially transversely to a plane defined by the axis of said lever and the journal between said lever and said link; cushion means being inserted between said second member and said lever so as to resiliently limit the relative movement between the two members, said cushion means acting in a transverse direction to the direction of rotation of said lever; the portions of said cushion means and said lever engaging each other, being provided with surfaces adapted to roll on one another during the relative movement of the said two members.

JOSEPH LEDWINKA.